Jan. 3, 1961 M. C. SICARD 2,966,990
FILTERING DEVICE
Filed March 28, 1958 2 Sheets-Sheet 1
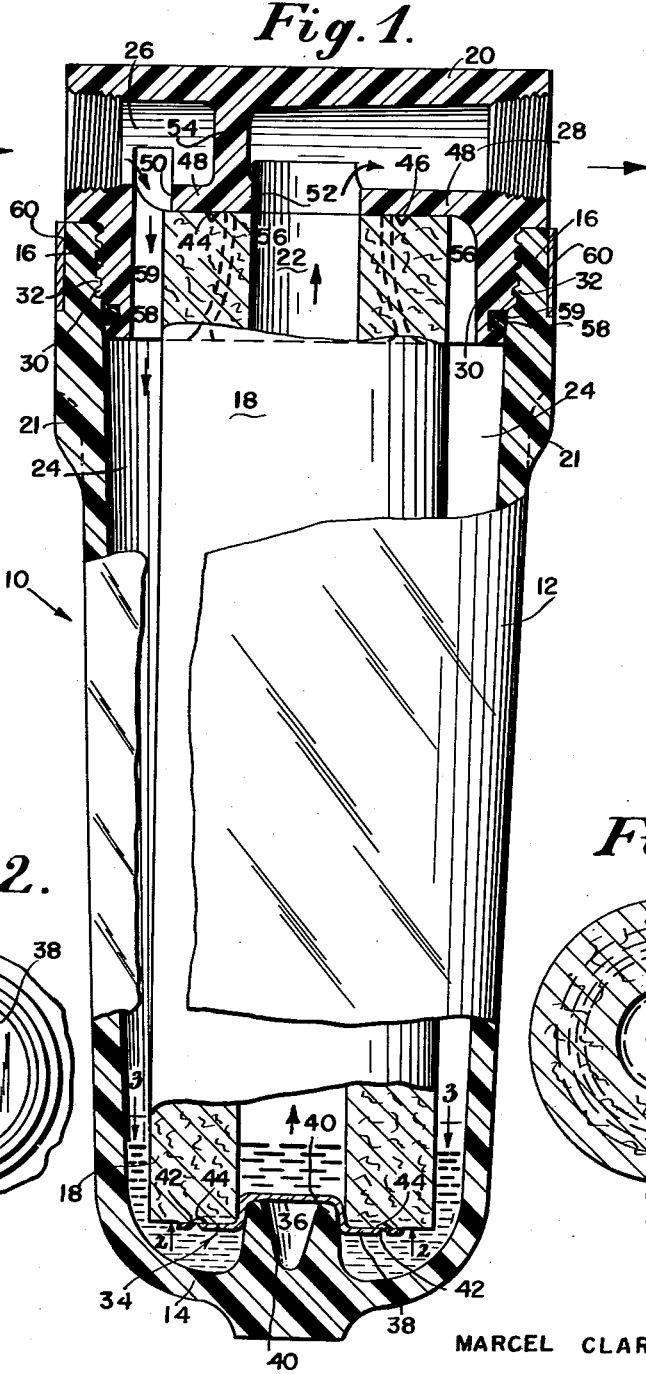
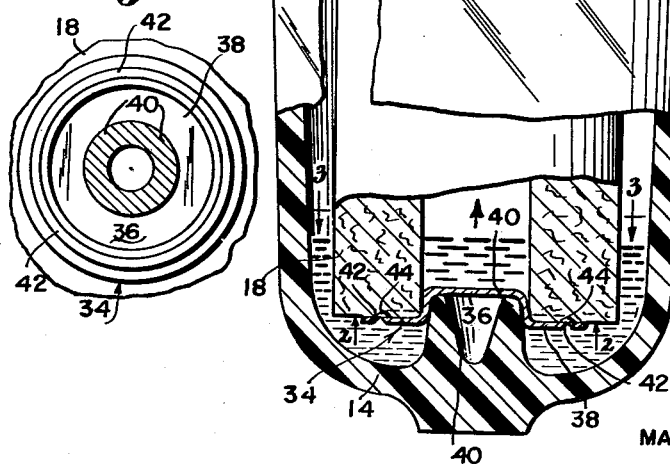
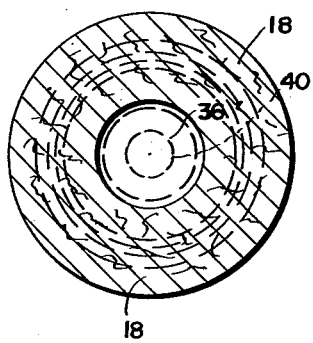
INVENTOR
MARCEL CLARENCE SICARD
BY Cushman, Darby & Cushman
ATTORNEYS Jan. 3, 1961
M. C. SICARD
2,966,990
FILTERING DEVICE
Filed March 28, 1958
2 Sheets-Sheet 2
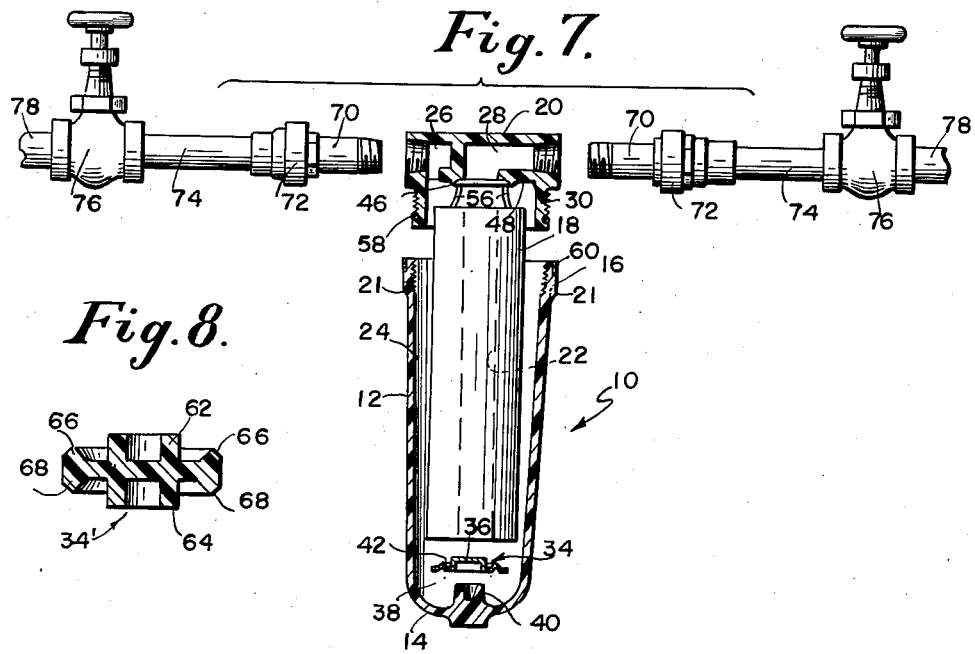
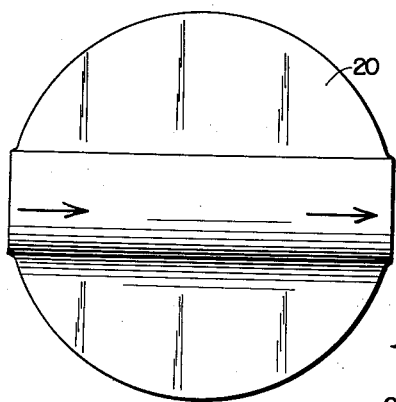
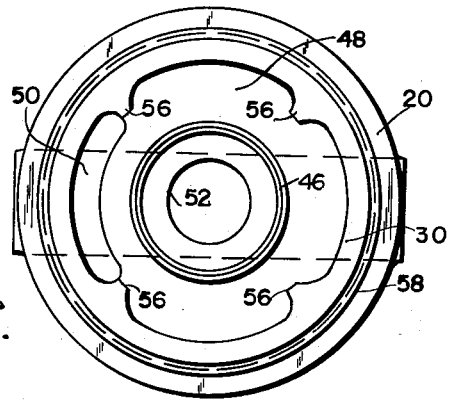
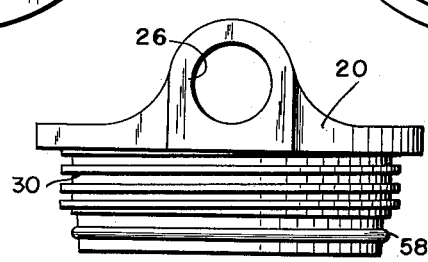
INVENTOR
MARCEL CLARENCE SICARD
BY Cushman, Darby & Cushman
ATTORNEY United States Patent Office 2,966,990
Patented Jan. 3, 1961

2,966,990
FILTERING DEVICE

Marcel Clarence Sicard, Cheshire, Conn., assignor, by mesne assignments, to American Machine & Foundry Company, New York, N.Y., a corporation of New Jersey Filed Mar. 28, 1958, Ser. No. 724,718

4 Claims. (Cl. 210—443)

This invention relates to filters for fluids. More particularly, the invention relates to filter constructions wherein the filter is in the form of a tubular cartridge made of fibrous or other suitable porous material mounted within a casing to define an annular chamber surrounding the cartridge and in communication with the longitudinal passageway within the cartridge through the fluid-pervious wall of the cartridge.

Filtering devices of the above type have previously been proposed wherein the casing is closed at both ends by suitable structures, with means on such end structures sealingly engaging the cartridge and holding it in position, and further wherein one of the end structures is provided with fluid inlet and outlet ports communicating with the annular chamber around the filter and with the longitudinal passageway within the filter. Heretofore, such filtering devices have usually been constructed so that the end closure structure or cap having the fluid ports therein is detachable whereby the interior of the casing can be cleaned and the filter cartridge removed and replaced, if desired. However, the means previously devised for effecting the seals at the cartridge ends and the detachable connection between the closure cap and the casing end have not been found to be entirely satisfactory for one reason or another. For example, there may be an undue amount of time or inconvenience involved in effecting the connection or removal of the closure cap; intricate, expensive and/or ineffective sealing structures and joints may be involved; or the ends of the filter cartridge may be subject to surface abrasions or injuries while the filtering device is being assembled thereby producing leaks that may impair the filtering function.

Accordingly, it is an object of this invention to provide a filtering device, of the type referred to, with novel structures and arrangements thereof facilitating assembly and disassembly of the device and particularly adapted to effect proper seals at the ends of the filter cartridge without damaging or injuring the cartridge itself.

In accordance with one embodiment of my invention, a filtering device, of the type referred to, includes a casing closed at one end, with a novel bearing construction being provided at this end for sealing engagement to an improved filter cartridge and a novel detachable closure cap being provided for the other end of the casing and rotatable into sealing engagement with the adjacent end of the cartridge. The construction and arrangement of the bearing, closure cap and filter cartridge is such that these three elements experience no rotation relative to each other, once they have been brought into engagement with each other, even though there is further relative rotation between the cap and casing as the joint therebetween is made tight.

Additional objects reside in the provision of an improved filter, of the type referred to, characterized by an overall simplicity of design, inexpensive construction, and attractive appearance.

Further objects and advantages of the invention will be in part obvious and in part pointed out hereinafter.

The novel features of the invention may be best made clear from the following description and accompanying drawings in which:

Figure 1 is an elevational view of a filtering device of the invention shown partially in vertical section and partially cut away for illustrative purposes;

Figure 2 is a sectional view taken generally along line 2—2 of Figure 1;

Figure 3 is a sectional view taken generally along line 3—3 of Figure 1;

Figure 4 is a top plan view of the closure cap for the filtering device of Figure 1;

Fgiure 5 is a bottom plan view of the closure cap;

Figure 6 is an elevational view of the closure cap;

Figure 7 is an exploded and partially sectioned view, on reduced scale, of the filtering device of Figure 1 and showing an exemplary fluid flow arrangement for attachment thereto;

Figure 8 is a vertical sectional view of a modification of one of the elements in the filtering device of Figure 1.

The embodiment of the filtering device of the invention, illustrated in the drawings, is indicated generally by numeral 10. As shown in Figures 1 and 7, it includes a casing or sump 12 having a closed bottom end 14 and an open top 16, with a filter cartridge 18 mounted therein, and with a cap 20 closing the open top thereof. The casing 12 may be constructed of any suitable material, but preferably is made of a transparent plastic, and is of generally cylindrical outline, having a slight upward and outward taper, as indicated. External and spaced ribs 21 or the like may be formed on casing 12, near top 16, to facilitate gripping and turning the casing. It will be understood that the precise external configuration of the casing is not critical. The cap 20 also may be constructed of any suitable material, but preferably is made of plastic.

The filter cartridge 18 preferably is of tubular cylindrical construction having a smaller outer diameter than the corresponding inner dimension of the casing 12, with a longitudinal passageway or bore 22 extending therethrough. The cartridge 18 will be constructed of some suitable porous, fluid-pervious material, such as a fibrous material. Preferably, it is made according to the teachings in Patent No. 2,539,768, or Patent No. 2,802,405.

The cartridge 18 is mounted in the casing 12 by means, to be described in detail hereinbelow, whereby an annular chamber 24 is defined between the cartridge 18 and the casing 12. The closure cap 20 is provided with separate fluid ports 26, 28 adapted to be respectively placed in communication with the annular chamber 24 and the central cartridge passageway 22 when the cap is mounted on the casing. A suitable rotary-type detachable connecting joint is provided between the cap 20 and the open casing end 16. This joint, in the illustrated form thereof, is defined by an externally threaded annular boss 30 depending from the cap and complementary internal threads 32 formed in the upper end of the casing.

It is contemplated by the invention that novel means be provided for forming the required seals at the ends of the cartridge 18 as the cap 20 is tightened onto the casing end. It is further contemplated that this novel means will enable the tightening movement between the cap and casing to be effected without any scraping or abrading of the cartridge.

In the preferred embodiment thereof, this novel means includes a bearing plate 34 mounted at the bottom of the casing. The plate 34 preferably is made of metal, and as best seen in Figures 1 and 7, is of generally hatshaped configuration, including a solid central portion 36 and an annular rim 38 extending outwardly therefrom. An internal upwardly extending circularly cylindrical projection or lug 40 is integrally formed at the bottom of the casing and mounts the plate 34 in the manner and position shown in Figures 1 and 2. An annular projection 42 is formed on the rim 38 and a complementarily shaped groove 44 will be formed by this projection 42 in the end surface of the filter cartridge 18 during assembly, as will be more fully developed hereinbelow. In this regard, it should be noted that the end surfaces of cartridge 18 preferably are initially flat and relatively smooth.

The central portion 36 of the bearing plate is constructed and arranged to enter the cartridge longitudinal passageway 22, as is evident. And the projection 42 and lower cartridge groove 44 formed thereby preferably are of the inverted V-shape sectional configuration shown.

A similar groove 44 is adapted to be formed in the other or upper end surface of the cartridge by an annular projection 46 formed on a transverse horizontal bottom wall 48 of the cap 20, as will be explained in greater detail hereinafter. An opening 50 is formed in wall 48 adjacent port 26 for establishing communication with the annular chamber 24; while a central aperture 52 is also formed in this wall opening into port 28 for establishing communication with the cartridge passageway 22. A dividing vertical wall 54 separates the ports 26, 28 from each other. And these ports may be threaded at their outer ends, as shown, for appropriate connection to externally threaded conduits.

A convenient procedure for assembling the filtering device of the invention will now be described. The bearing plate 34, inverted, is first placed on the top of cartridge 18 with portion 36 in passageway 22, and the casing 12, inverted, is then lowered over these parts until boss 40 properly seats in the portion 36 of plate 34. These parts are then inverted to their upright position shown in Figure 1. At this time, the casing upper end 16 is brought into engagement with the threaded boss 30 on the cap and relative rotation is effected between the casing and cap to tighten the joint therebetween. During such tightening, the projection 46 on the cap 20, and projection 42 on plate 34 will be brought into firm frictional engagement with the heretofore flat and undeformed cartridge end surfaces.

Upon further tightening of the joint, there will be no relative rotation between the cap 20, cartridge 18 and plate 34. However, there will of course be relative rotation between the casing 12 on the one hand, and the cap 20, cartridge 18 and plate 34 on the other hand. It is during this final tightening that the projections 42, 46 press into the cartridge ends to form the sealing grooves 44 therein. This takes place as a crushing action involving no scraping or relative rotation between the cartridge, the cap and bearing plate.

Guiding ribs 56 preferably are formed on the boss 30, extending inwardly therefrom and arranged at suitable intervals therearound, such as shown in Figures 1, 5 and 7. These ribs will engage and guide the upper end of the cartridge 18 as the cap is being tightened.

During the tightening of the joint between the cap and casing, rotation occurs between plate 34 and lug 40, rather than between projection 42 on plate 34 and cartridge 18, because the diameter of the circular bearing area defined by lug 40 is much smaller than the diameter of the projection 42, and also possibly because of the inherently smaller friction between the metal bearing 34 and plastic lug 40, than between the fibrous cartridge 18 and the metal projection 42.

If desired, although not preferred, the cartridge 18 may be preformed with grooves 44 therein. In that case, there will still be no undesirable scraping or relative rotation between cartridge 18, cap 20 and plate 34. The parts may be assembled in substantially the same manner as that described above with projection 42 initially being disposed in the adjacent groove 44. As the joint between the cap and casing is tightened, projection 46 will enter the adjacent preformed groove 44 at the other end of the cartridge.

When this projection 46 is disposed in the preformed groove 44 so that it engages the surfaces of the groove, the cap 20, cartridge 18, and bearing plate 34 will then be firmly and frictionally held together so that no relative rotation therebetween will take place, and the further relative rotation between the casing and the cap to tighten the joint therebetween will not result in any relative rotation between the bearing plate 34 and cartridge 18, or between the cap 20 and cartridge 18. Similarly, as the joint between the cap and casing is loosened from its final tightened position, no relative rotation takes place between cap 20, cartridge 18 and bearing plate 34 until projection 46 on cap 20 is disengaged from the adjacent groove 44. At that time the cartridge and plate 34 will be stationary relative to each other while cap 20 will rotate relative thereto.

In either case, and whether grooves 44 are preformed or formed by projections 42, 46 as described above, it should be noted that during the final tightening movement, or the initial loosening movement of the joint between the cap and casing, there will be relative rotation between lug 40 at the bottom of the casing and the bearing plate 34 resting thereon, as well as between the cap 20 and casing 12, but no rotation between cap 20, cartridge 18 and plate 34.

An annular sealing ring 58, or O ring, is shown arranged in an external annular groove 59 in the boss 30, as indicated in Figures 1 and 7, for sealing the joint between the cap and casing. A reinforcing circular band 60 may be provided around the upper end of the casing 12, as shown. This band may be first heated and expanded and then placed around the casing, as shown, and allowed to cool and tightly contract into a secure final position, thus strengthening the casing.

Figure 8 illustrates a modification of the bearing plate 34 of Figures 1 and 7. The bearing plate 34' of Figure 8 is of generally disc-like configuration having an upper 62 and lower 64 annular boss formed concentrically thereon, as indicated, with upper 66 and lower 68 annular projections located at the outer portion thereof. As will be evident, the bearing plate 34' will be mounted at the bottom of casing 14 so that the lug 40 at the bottom of the casing is disposed in the lower boss 64 for relative rotation therebetween, with the upper boss 62 adapted to extend into the bottom of the cartridge passageway 22, and with the projection 66 adapted to form or fit within the annular groove 44 on the cartridge end, depending on whether the cartridge end surfaces are initially undeformed or whether they are preformed with grooves 44. Due to its symmetrical top and bottom, plate 34' will function the same whether mounted upright or inverted. The plate 34' may be made of metal, plastic or other appropriate material.

If desired, the bottom part of casing 12 may be made separately, with appropriate means being provided for sealingly connecting it to the casing.

Figure 7 illustrates an installation of the filtering device of the invention in a flow line, for example, a domestic water system. As there shown, an externally threaded pipe 70 is adapted to be connected in each of the ports 26, 28. The pipes 70 may be connected at joint 72 to the conduit section 74 communicating through valve 76 with the conduit section 78. Assuming flow is from left to right, as viewed in Figure 7, the water enters annular chamber 24 through port 26 and then flows through the side walls of the cartridge 18 up through passageway 22 and out the port 28. In this installation, the casing 12 with the filter cartridge 18 and bearing plate 34 or 34' therein may be attached to the closure cap 20 after the latter has been secured to the pipes 70. Thereafter, if it is desired or necessary to remove the casing from the cap, this may conveniently be accomplished merely by turning the casing off the cap. Subsequent attachment of the casing to the cap will be similarly effected.

The present invention is particularly advantageous with filter cartridges made of a fibrous or other material subject to surface injury, since there will be no scraping or damaging of the surface thereof around the seal grooves 44 when the device is being assembled or dismantled. As previously indicated, as soon as the projections 42, 46 are in a position against the cartridge end surfaces where they could scar or scratch such surfaces, the cartridge is then held to the cap 20 and bearing plate 34 so that no relative movement therebetween occurs, the rotation occurring between plate 34 and boss 40. It will be appreciated that this action likewise prevents any surface injuries to the projections 42, 46 on the bearing 34 and cap 20 respectively.

Thus, there is no possibility of scratches, tears or local breakage being produced adjacent the sealing projections 42, 46 and grooves 44 which might otherwise destroy the seal therebetween with the consequent impairment of the filtering operation.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

I claim:

1. A filtering device including a casing closed at one end and open at the other, a tubular filter cartridge arranged longitudinally in said casing and defining an annular chamber therewith, a bearing member rotatably mounted on the closed end of said casing and engaging one end of said filter cartridge, a cap threadably engaging and closing the open end of said casing, said cap engaging the other end of said filter cartridge and including fluid ports communicating respectively with said annular chamber and with the interior of said filter cartridge, said cap and said bearing plate being provided with annular projections adapted to engage the ends of said filter cartridge and effect fluid seals therewith, said projections being effective also to cause said filter cartridge and said bearing plate to rotate as a unit with said cap as the cap is assembled onto the casing, whereby abrasion detrimental to said seals is avoided.

2. A filtering device including a casing closed at one end and open at the other, a tubular filter cartridge arranged longitudinally in said casing and defining an annular chamber therewith, a bearing member rotatably mounted on the closed end of said casing and engaging one end of said filter cartridge, a cap threadably engaging and closing the open end of said casing, a sealing ring mounted between facing cylindrical walls of said cap and said casing, said cap engaging the other end of said filter cartridge and including fluid ports communicating respectively with said annular chamber and with the interior of said filter cartridge, said cap and said bearing plate being provided with annular projections adapted to engage the ends of said filter cartridge and effect fluid seals therewith, said projections being effective also to cause said filter cartridge and said bearing plate to rotate as a unit with said cap as the cap is assembled onto the casing, whereby abrasion deterimental to said seals is avoided.

3. A filtering device as defined in claim 2, including a bearing support for said bearing member integral with said casing.

4. A filtering device as defined in claim 2, wherein said cap includes centering means engageable with said filter cartridge as the cap is assembled onto the casing.

References Cited in the file of this patent

UNITED STATES PATENTS

| | | |
|---|---|---|
| 1,251,601 | Weiwoda | Jan. 1, 1918 |
| 2,071,996 | Baldwin | Feb. 23, 1937 |
| 2,162,043 | Westlund et al. | June 13, 1939 |
| 2,284,787 | Winkler | June 2, 1942 |
| 2,320,990 | White | June 8, 1943 |
| 2,382,278 | Widmann | Aug. 14, 1945 |
| 2,413,769 | Kasten | Jan. 7, 1947 |
| 2,539,768 | Anderson | Jan. 30, 1951 |
| 2,620,071 | Zenick | Dec. 2, 1952 |
| 2,753,047 | Kettlewell | July 3, 1956 |